(12) United States Patent
Juventin et al.

(10) Patent No.: US 9,786,875 B2
(45) Date of Patent: Oct. 10, 2017

(54) POWER STORAGE MODULE INCLUDING MOVABLE MEANS FOR SETTING A PLURALITY OF POWER STORAGE ELEMENTS

(71) Applicant: BLUE SOLUTIONS, Ergue Gaberic (FR)

(72) Inventors: Anne-Claire Juventin, Quimper (FR); Laurent Le Gall, Ergue Gaberic (FR)

(73) Assignee: BLUE SOLUTIONS, Ergue Gaberic (FR)

( * ) Notice: Subject to any disclaimer, the term of this patent is extended or adjusted under 35 U.S.C. 154(b) by 368 days.

(21) Appl. No.: 14/397,849

(22) PCT Filed: Apr. 30, 2013

(86) PCT No.: PCT/EP2013/058970
§ 371 (c)(1),
(2) Date: Feb. 2, 2015

(87) PCT Pub. No.: WO2013/164335
PCT Pub. Date: Nov. 7, 2013

(65) Prior Publication Data
US 2015/0171385 A1    Jun. 18, 2015

(30) Foreign Application Priority Data
Apr. 30, 2012  (FR) ..................... 12 53980

(51) Int. Cl.
*H01M 2/10*  (2006.01)
*H01M 10/653*  (2014.01)
(Continued)

(52) U.S. Cl.
CPC .......... *H01M 2/1016* (2013.01); *H01G 11/08* (2013.01); *H01G 11/14* (2013.01);
(Continued)

(58) Field of Classification Search
None
See application file for complete search history.

(56) References Cited

U.S. PATENT DOCUMENTS 6,162,559 A     12/2000  Vutetakis et al.
2006/0286441 A1*  12/2006  Matsuoka ............. H01M 2/105
                                            429/99
(Continued)

FOREIGN PATENT DOCUMENTS

DE   10 2007 063 186 A1    6/2009
DE   10 2008 034 862 A1    1/2010
(Continued)

OTHER PUBLICATIONS

U.S. Office Action dated Nov. 7, 2016, U.S. Appl. No. 14/397,850.
(Continued)

*Primary Examiner* — Lucas J. O'Donnell
(74) *Attorney, Agent, or Firm* — Blakely Sokoloff Taylor & Zafman LLP

(57) ABSTRACT

The invention relates to a power storage module (10) capable of containing a plurality of power storage elements (14), the module including: a housing (16) including at least a plurality of side walls and two end walls (18A; 18B), the side walls consisting of one piece (20) having a closed outline and being sized so as to surround the power storage elements; a wall (22) for supporting the power storage elements, which is separate from the walls of the housing, and which extends essentially parallel to one of the side walls, referred to as a reference wall (20A); a means (24A-24B) for changing the position of the supporting wall (22) between at least an assembly position, in which the supporting wall is located at a first distance from the reference wall (20A), and an operating position, in which the
(Continued)

Figure 1:
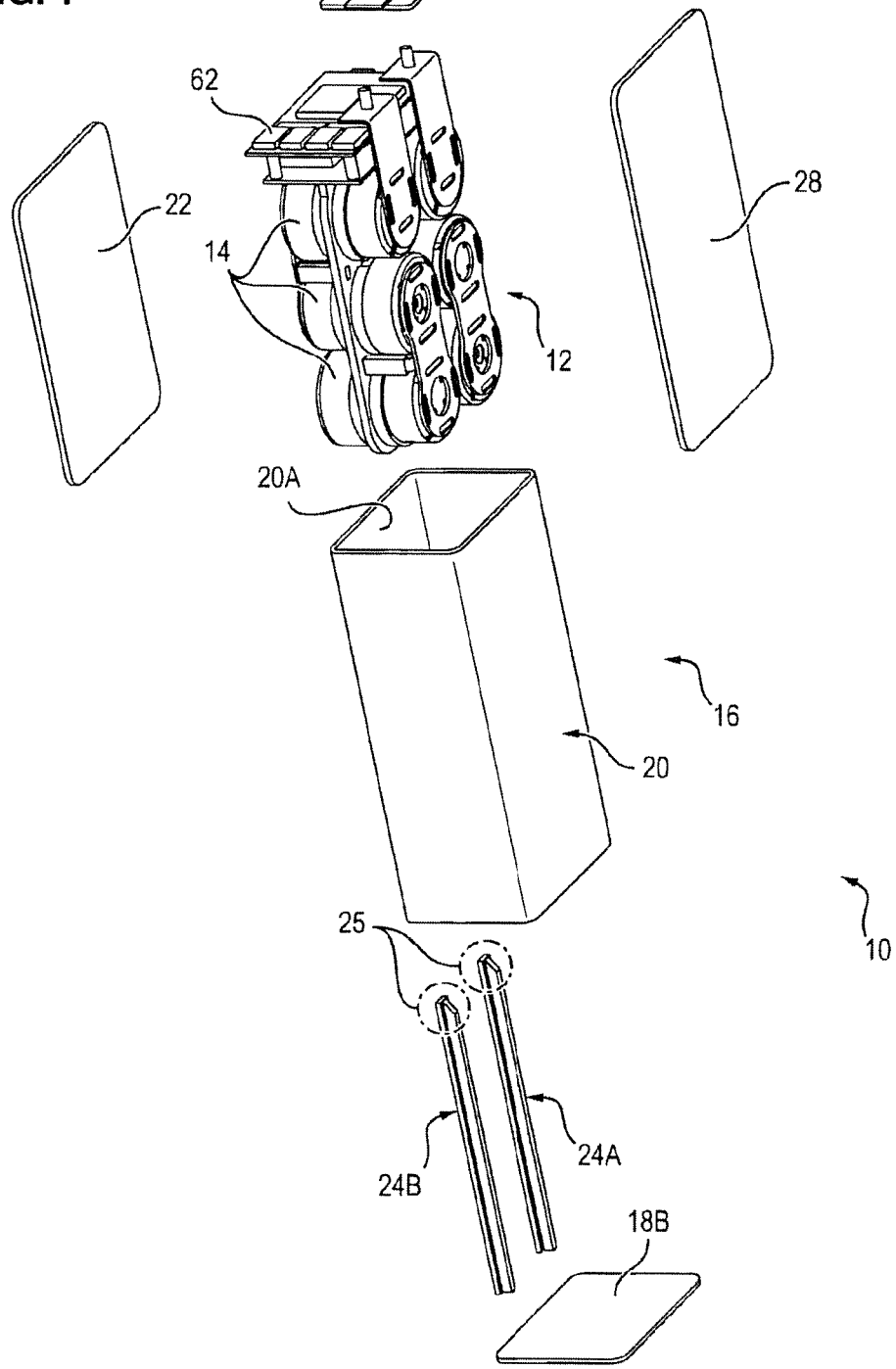

supporting wall is located at a second distance from the reference wall (20A) that is greater than the first distance.

18 Claims, 7 Drawing Sheets

(51) Int. Cl.
| | | |
|---|---|---|
| *H01M 10/643* | (2014.01) | |
| *H01M 10/6554* | (2014.01) | |
| *H01M 10/613* | (2014.01) | |
| *H01G 11/08* | (2013.01) | |
| *H01G 11/82* | (2013.01) | |
| *H01G 11/14* | (2013.01) | |
| *H01M 10/6551* | (2014.01) | |

(52) U.S. Cl.
CPC ............ *H01G 11/82* (2013.01); *H01M 2/105* (2013.01); *H01M 2/1022* (2013.01); *H01M 2/1072* (2013.01); *H01M 2/1077* (2013.01); *H01M 10/613* (2015.04); *H01M 10/643* (2015.04); *H01M 10/653* (2015.04); *H01M 10/6554* (2015.04); *H01M 10/6551* (2015.04); *Y10T 29/49002* (2015.01); *Y10T 29/49108* (2015.01)

(56) References Cited

U.S. PATENT DOCUMENTS

| | | | |
|---|---|---|---|
| 2011/0183177 A1 | 7/2011 | Sohn | |
| 2012/0148877 A1* | 6/2012 | Kalman | ................ H01M 2/105 |
| | | | 429/7 |

FOREIGN PATENT DOCUMENTS

| | | |
|---|---|---|
| EP | 0 989 618 A1 | 3/2000 |
| EP | 2099085 A2 | 9/2009 |

OTHER PUBLICATIONS

Machine Translation of DE102007063186, Meintschel, Jens, et al., published Jun. 25, 2009.

* cited by examiner

POWER STORAGE MODULE INCLUDING MOVABLE MEANS FOR SETTING A PLURALITY OF POWER STORAGE ELEMENTS

The subject of the present invention is an energy storage module comprising a plurality of energy storage elements.

Such energy storage elements can comprise a condenser, a battery, a supercapacitor, etc. Each of these elements generally comprises an electrochemical core storing energy and comprising at least one positive electrode and one negative electrode, and a rigid external casing mechanically protecting the electrochemical core. The electrochemical core is connected to the casing such that a positive terminal and a negative terminal of the storage element are accessible from the exterior of the latter.

A module is an assembly comprising a plurality of energy storage elements arranged side by side and connected electrically, generally in series. It provides energy storage element assemblies in a single block supporting higher voltage and providing greater storage capacity than unitary elements. In addition to containing the storage elements, it generally comprises many functional elements (electric insulation, thermal conduction, balancing of the load of the storage elements, etc.) which ensure proper operation of the module.

An energy storage module comprising a plurality of energy storage elements arranged side by side is already known in the prior art. This module comprising an external parallelepiped envelope comprising six independent walls attached to each other during assembly of the module. It also comprises a thermal conduction mat on which the storage elements are placed, such a mat conducting heat from the elements to the exterior of the module. One of the walls, especially the lower wall of the module, can also comprise cooling fins for better evacuation of heat to the exterior of the module.

Such a module is satisfactory for the majority of applications. However, for some applications the aim is always to boost the volume capacity of the module. Now, the increase of the volume capacity causes an increase in heat produced, and can cause poor evacuation of heat or, to rectify this disadvantage, an increase in volume for the purposes of evacuation of heat which does not significantly increase the volume capacity of the module.

To rectify the above disadvantages, the aim of the invention is an energy storage module capable of containing a plurality of energy storage elements, the module comprising:

an envelope comprising at least a plurality of lateral walls and two end walls, the lateral walls being made in a single piece having a closed outline and sized to enclose the energy storage elements, a supporting wall of the energy storage elements separate from the walls of the envelope, and intended to extend essentially parallel to one of the lateral walls, called a reference wall, means capable of modifying the position of the supporting wall, between at least one assembly position, in which it is at a first distance from the reference wall, and an operating position, in which it is at a second distance from the reference wall, greater than the first distance.

Within the scope of the present invention "supporting wall" means a solid plate, or a pierced plate composed for example of four segments assembled in a quadrilateral and constituting a frame, each segment being intended to come in contact with one or more storage elements.

The envelope comprising several walls in a single piece actually allows better circulation of the heat within the envelope than in the prior art, since there is no discontinuity in material between two adjacent walls. The heat is better distributed between the different walls of the envelope and the exchange surface of the envelope with the air is bigger. Heat evacuated at the level of the envelope can therefore easily be increased without adding fins to the latter. It is evident however that the invention does not exclude protection of a module such as defined hereinabove and whereof the envelope is fitted with fins. These fins are simply not necessary because of the configuration of the envelope.

The installation constituted by the supporting wall and means for modifying the position of the latter easily slides the elements in the envelope, when the supporting wall is in the assembly position, by pressing these elements against a wall of the envelope also for good evacuation of heat from the elements to the envelope of the module, when the latter is in the operating position. Evidently, a mat can be interposed between the envelope and the storage elements.

In fact, during insertion of the elements into the envelope, the supporting wall is placed in the assembly position, and there is still no close contact of the elements with the walls of the envelope. The elements can therefore easily be inserted and placed in the best way in the piece. Next, because of the above means, when in the operating position the supporting wall is placed permanently, this position pressing the elements against the wall of the envelope capable of dissipating heat.

It is also evident that the module according to the invention has other advantages, especially:

the heat evacuation wall no longer has to be the lower wall of the module, a wall against which the elements were in close contact because of gravity (since the elements can easily be pressed against any wall of the module without the assembly method of the module being complex). In this way, there is more flexibility in the choice heat of evacuation wall (wall in contact with the elements, optionally by means of a thermal mat), and the most adapted wall can be selected as a function of the members enclosing the module (for example, the wall closest to a cooling element or further away from another member releasing heat), having an already partially formed envelope (several walls made in a single piece) simplifies the assembly method of the module, avoiding relative complex positioning of the walls relative to each other. In addition, the fact that the envelope comprises fewer pieces obviates many problems, such as problems of tightness between the different pieces of the envelope. The assembly method of the module can therefore be simplified and costs associated with manufacture of the latter can be lowered.

Figure 2:
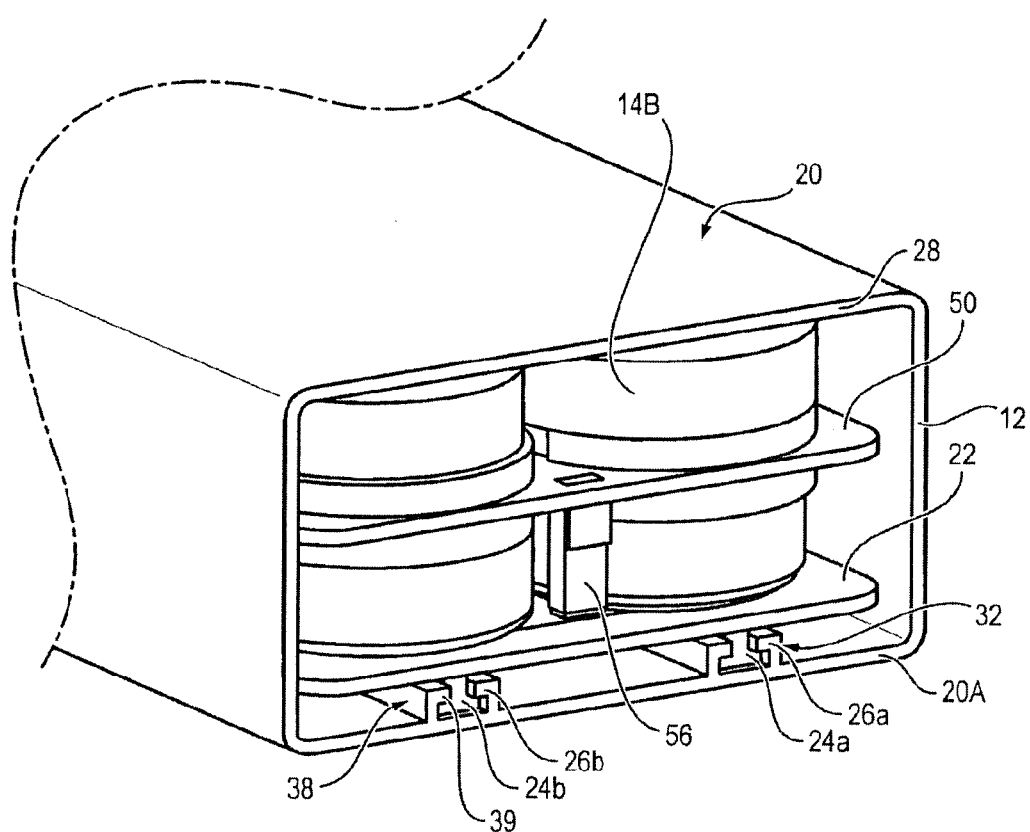
Figure 3:
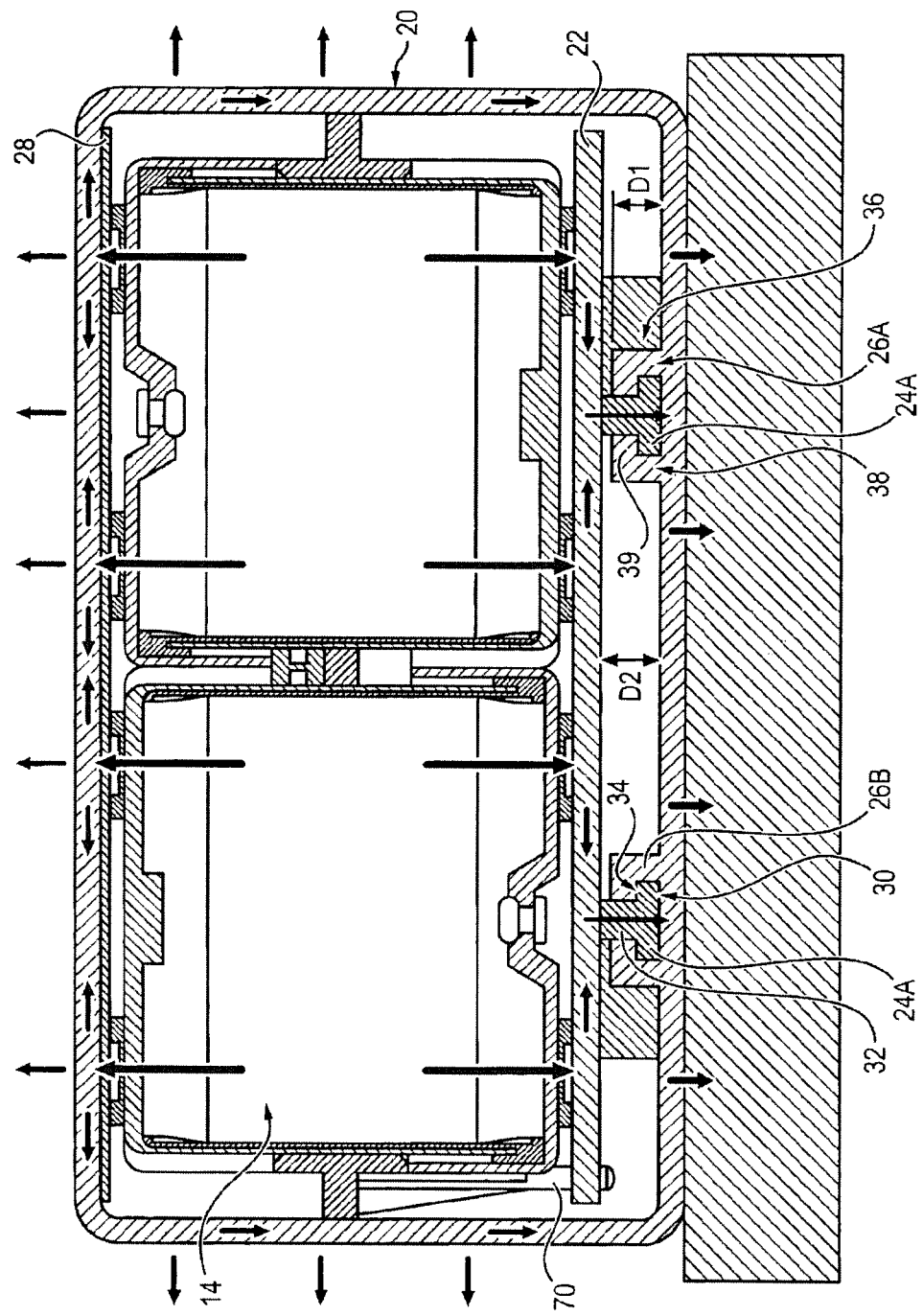
Figure 4:
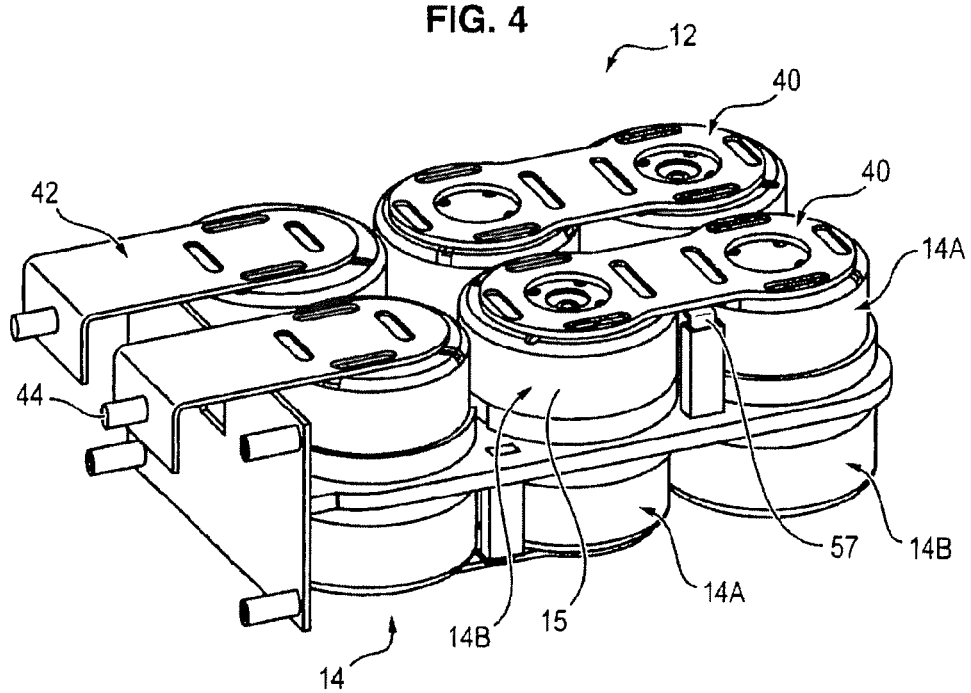
Figure 5:
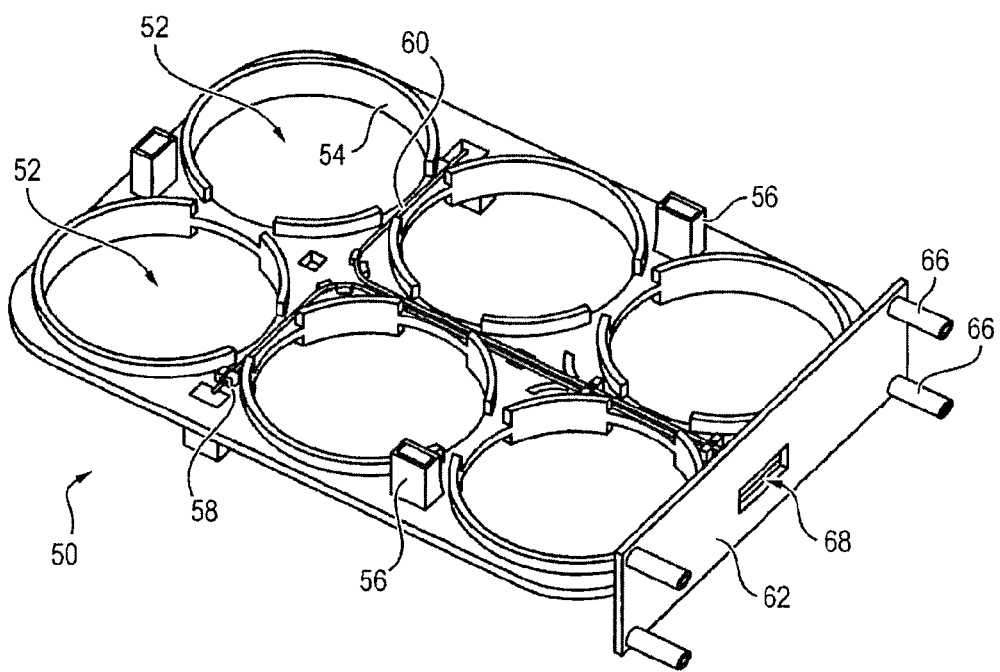
Figure 6:
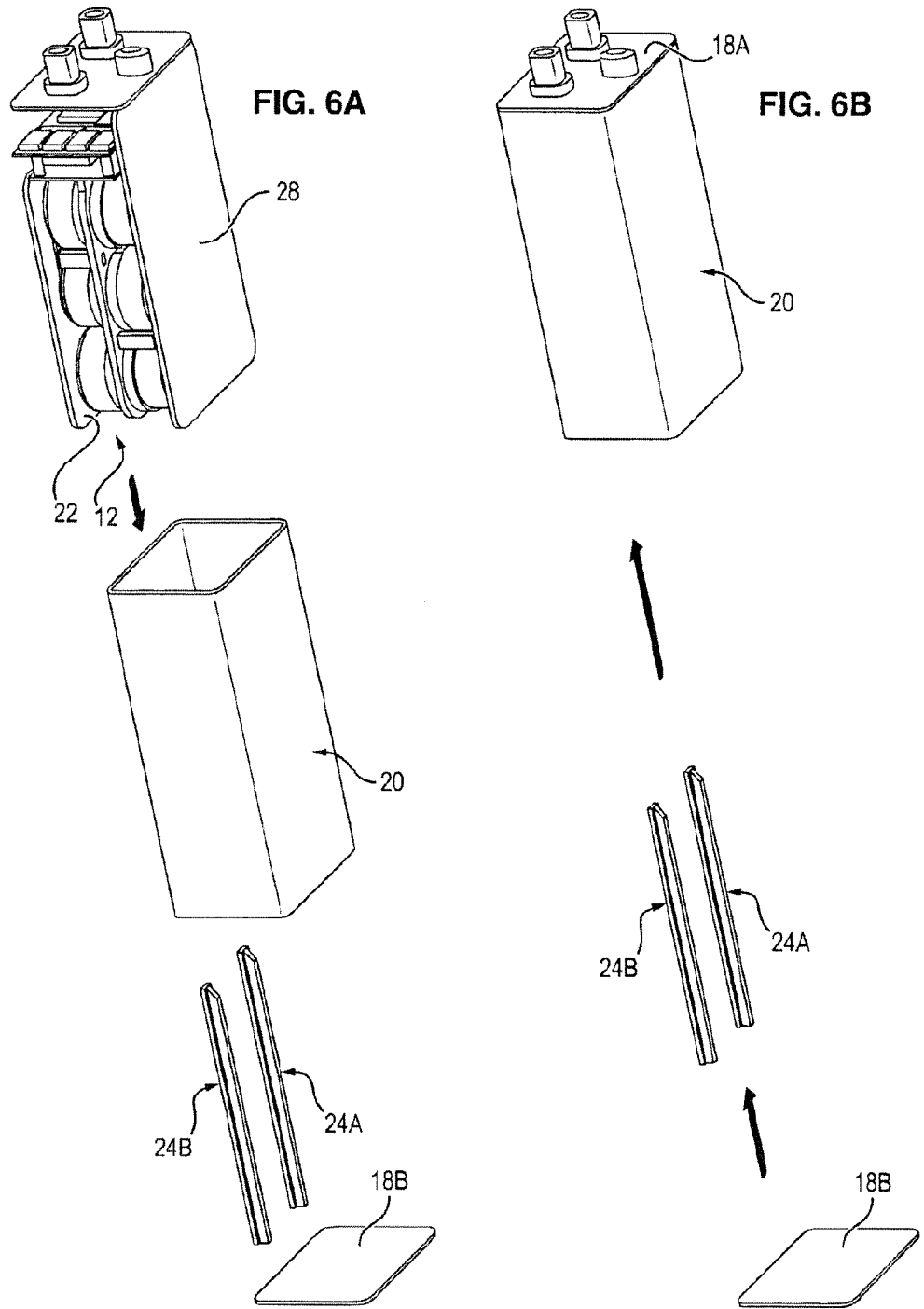
Figure 7:
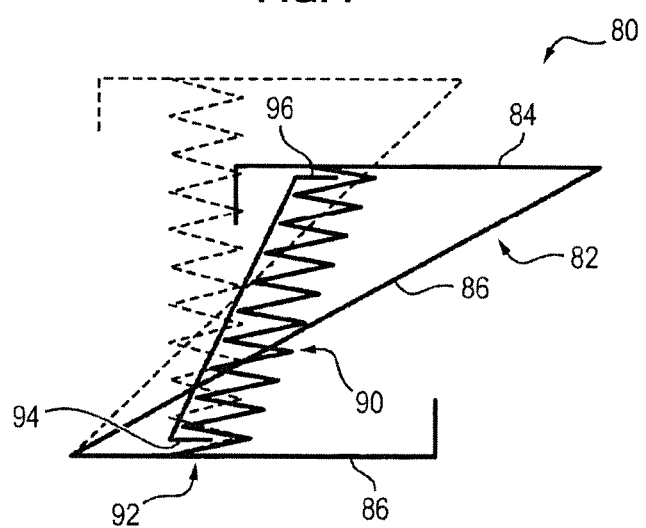
Figure 8A:
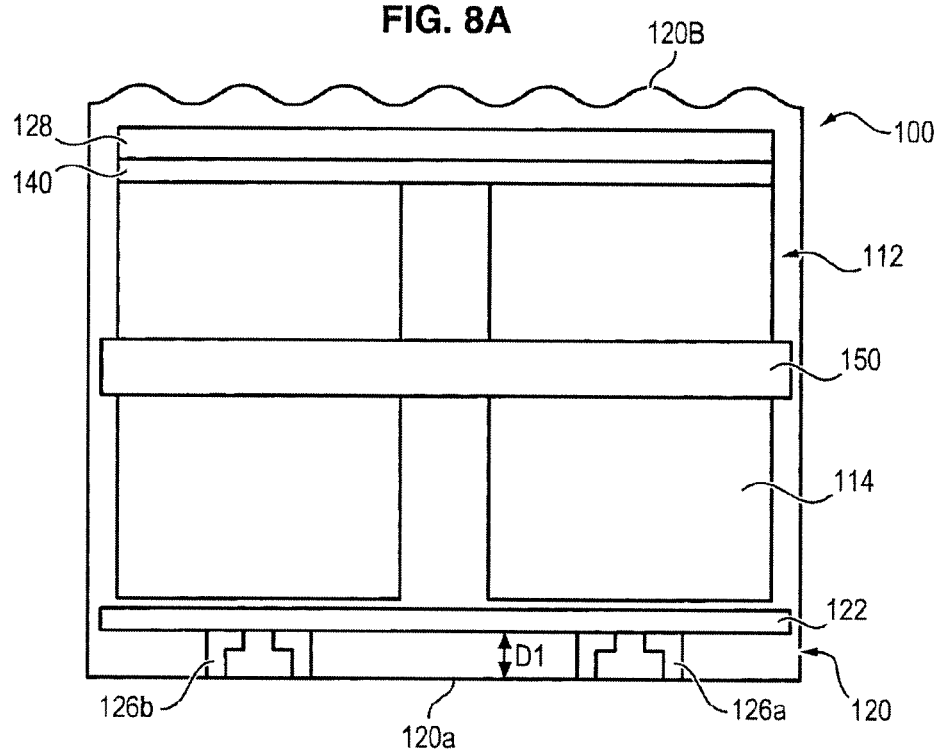
Figure 8B:
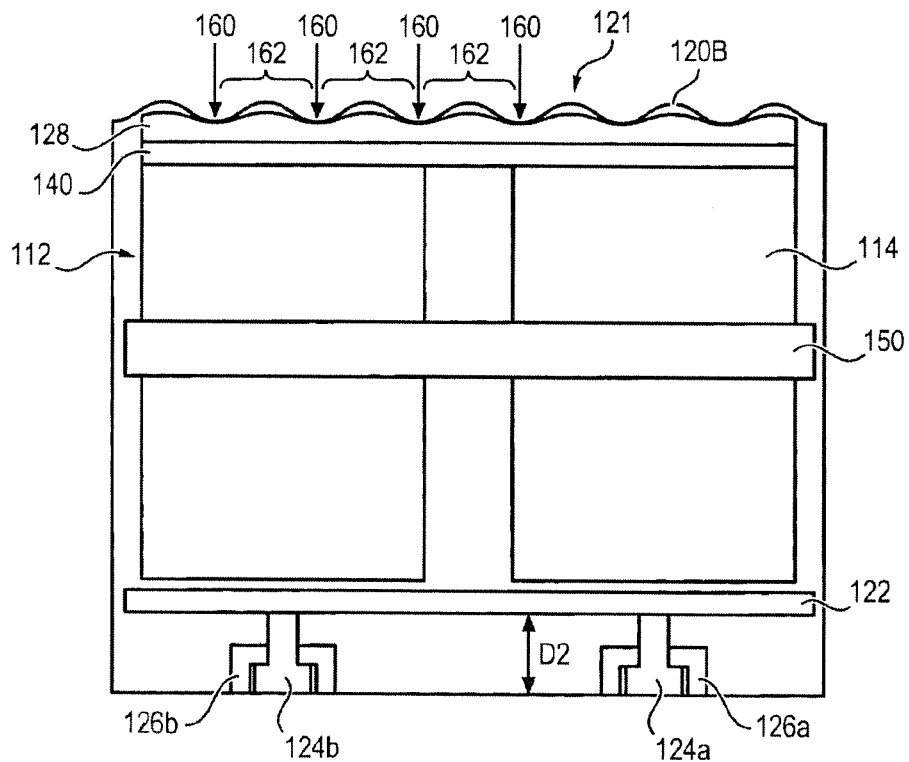

The invention will now be described in reference to the appended figures, showing a non-limiting embodiment of the invention, in which:

FIG. 1 is an exploded view of an energy storage module according to an embodiment of the invention, FIG. 2 is a side view of the module of FIG. 1, FIG. 3 is a sectional view of the module of FIG. 1, showing the heat evacuation mechanisms, FIG. 4 is a view in perspective of a module core of the module of FIG. 1, FIG. 5 is a view in perspective of a shimming structure of the module of FIG. 1, FIGS. 6A and 6B show different intermediate stages of the assembly method of the module according to FIG. 1, FIG. 7 is a side view of a shim according to a variant of the embodiment of FIG. 1, FIGS. 8A and 8B are side views of a module according to a variant of the embodiment of FIG. 1, at different steps of the assembly method of the module.

As indicated earlier, the module 10, 100 according to the invention is capable of containing a plurality of energy storage elements 14, 114, and comprises:

an envelope 16 comprising at least a plurality of lateral walls and two end walls 18A-18B, the lateral walls being made in a single piece 20, 120 having a closed outline and sized to enclose the energy storage elements, a supporting wall 22, 122 of the energy storage elements separate from the walls of the envelope, and intended to extend essentially parallel to one of the lateral walls, called a reference wall 20A, 120A, means 24A-24B; 80A-80B; 124-126 capable of modifying the position of the supporting wall 22, 122 between at least one assembly position, in which it is at a first distance D1 from the reference wall 20A, 120A and an operating position, in which it is at a second distance D2 from the reference wall 22A, 122A, greater than the first distance D1.

The module according to the invention can also comprise one or more characteristics of the list hereinbelow:

the piece 20, 120 comprising the lateral walls is open at its two ends, the module further comprising two end walls 18A-18B independent of the piece and capable of closing the latter at its two open ends. The piece has a tubular shape and can be manufactured continuously. It can also be extruded. This further limits the manufacturing costs of the module. Alternatively, the piece can also integrate one of the end walls of the envelope and be open only at one end to slide the elements and the longitudinal members. The number of assembly steps can be decreased but the piece is more complex to manufacture, the envelope 16 has a parallelepiped form, the piece 20 comprising four lateral walls. This configuration is in fact the optimal configuration in terms of bulk of the module, the means for positioning the supporting wall comprise at least one shim 24A-24B; 80A-80B intended to be inserted between the reference wall 20A and the supporting wall 22. This shim can have the form of a longitudinal member 24A-24B, 80A-80B extending especially over the entire dimension of the reference wall. It is evident in fact that longitudinal members are easier to insert due to their lesser contact surface and because they are in a single piece.

in the preceding case, the reference wall 20A comprises at least one guide rail 26A-26B capable of cooperating with the or at least one of the shims or longitudinal members 24A-24B; 80A-80B. This makes the insertion step of the longitudinal member in the module easier. The rail can simply comprise two longitudinal projections 38 between which the shim or the longitudinal member is intended to be inserted. These projections hold the shim in the plane of the reference wall, the latter being held by the stack without play of the different elements in the envelope, according to the direction normal to the wall. These rails are easy enough to make. They can however comprise more complex forms, for example a return 39 comprising a stop surface located at a distance from the reference wall 20A and parallel to the latter, to also block the shim or the longitudinal member according to the direction normal to the reference wall. When the reference wall is the lower wall of the module, the rails 26A-26B can also help hold the supporting wall 22 at a distance from the reference wall prior to insertion of the shims in the envelope, which makes their insertion easier and prevents the supporting wall from lifting too suddenly, which would risk modifying the disposition of the elements 14 on the latter;

a plurality of shims or longitudinal members, for example two shims, can be placed between a reference wall and the supporting wall, the shim 24A-24B has a bevelled form 25 at one of its ends according to the longitudinal direction. Its thickness is therefore variable according to this direction, making its insertion in the module easier, especially when the reference wall is the lower wall of the envelope and the supporting wall supports the elements and is therefore naturally placed on the reference wall (or the rails) because of the weight of the elements, the means for modifying the position of the supporting wall can also comprise elastic means 90; 124 and means 92; 126 for holding the elastic means in a stressed position. In this case, the stressed position is especially the position ensuring that the distance between reference wall and supporting wall is the distance D1 from the assembly position. The elastic means are especially springs held compressed. This solution effectively manages the clearances and manufacturing tolerances of the different elements of the module. In fact, as a function of the manufacturing tolerances of the piece 20, 120 of the envelope, the position of the supporting wall can be selected so that the elements are pressed against the upper wall of the module, not always possible with rigid shims (less flexibility in terms of the choice of the operating position), in the present case hereinabove, the means for holding the spring or the springs in a stressed position can comprise at least one pliers 92; 126 having two branches 94-96; 132-134 between which the elastic means extend and a predetermined spread between its branches. The means for holding the elastic means in the stressed position can also comprise at least one material tab connecting two walls relative to which the ends of the elastic means are positioned, this tab being breakable.

the or at least one of the shims 80A-80B is configured so that it can deform elastically at least according to the direction normal to the reference wall 20A to which it is connected. This elastic deformation can be achieved because of the material comprising the shim or of the fact of its form (Z form, for example). Such a shim 80 can also be connected to elastic means 90, especially placed between a lower wall 86 and an upper wall 84 of the latter, and optionally holding means 92, the module comprises at least one member 28, 128 made of compressible material, intended to be placed between the supporting wall 22, 122 and the storage elements 14, 114 and/or between the storage elements and a lateral wall of the envelope 20B, 120B opposite the reference wall (thermal dissipation wall). Such a member presses all the storage elements against the wall, taking into account the manufacturing tolerances of the different pieces of the module, especially the elements, and also makes for easier insertion of the longitudinal members, because of the clearance it offers according to the stack direction. This member can be made of electrically insulating but thermally conductive material such as EPDM (ethylene-propylene-diene monomer) and can especially form a thermal mat such as mentioned earlier. In this case it is preferably placed between the wall selected for thermal dissipation (especially opposite the reference wall) and the elements. Such a member or thermal mat is preferably essentially flat, and covers the whole surface of one of the holding walls or of the envelope. The module can also comprise two mats, one being placed at each of the ends of the energy storage elements, the wall 120B of the envelope opposite the reference wall 120A is configured such that its distance relative to the reference wall varies locally. It can comprise undulations 121 for example. The wall is configured such that the distance spread does not go over 1 cm, especially 5 mm. Such a configuration presses all the storage elements against the wall, even those of lesser height, without as such damaging the member 128 or thermal mat intended to be compressed to better manage these clearances. In fact, when the wall 120B is not flat and an element 114 of considerable height is placed between the supporting wall and the wall opposite the reference wall, the thermal mat is highly compressed. When the distance varies between the reference wall 120A and the opposite wall 120B, there are areas (the areas farthest from the reference wall, which will not be in contact with the elements) which can leave space for the member 28 so that the latter deforms. Alternatively, the member 128 can be configured to comprise recesses, especially having a slotted configuration to allow its deformation in these hollowed areas, the or at least one of the shims 24A-24B, 80A-80B, the elastic means 124 and/or the supporting wall 22, 122 are made of thermally conductive material. The shims 24A-24B are made especially of metal, even if they could also be made of thermally insulating material. The supporting wall 22 is as such preferably made of electrically insulating material also to prevent short-circuits between the storage elements which do not have the same potential. It could also be made of metal and covered in a thermal mat. This configuration is particularly advantageous since a second heat evacuation route is created by means of the supporting wall and shims in addition to evacuation via the main heat dissipation wall. As per the direction normal to the reference wall, the elements being stacked without play in the envelope, heat is transmitted fairly effectively to the envelope since contact is close between the different pieces of the module, the module comprises a single reference wall 20A, 120A formed by the lower wall or the upper wall of the envelope 16, constituting larger evacuation surfaces, which are which more in contact with all the elements. The module could where necessary also comprise several reference walls or a reference wall which would be vertical once the module is placed in its environment, the module comprises a shimming structure 50, 150 of the storage elements, made of insulating electrically material, especially plastic material, and comprising a plurality of housings 52 to receive the energy storage elements 14, 114. Such a structure 50, 150 wedges the elements relative to each other and electrically insulates them relative to each other. In the method according to the invention, since placement of the storage elements 14 is carried out by sliding, such a structure is particularly advantageous, since it attaches the relative position of the energy storage elements prior to insertion of the elements in the envelope and therefore exempts an operator from making complex adjustments blindly. In addition, such a structure offers a frame for automatically placing storage elements in the latter, the shimming structure 50, 150 comprises positioning means 70; 170, especially attachment, relative to the supporting wall 22, 122. Therefore, even if the supporting wall moves or inclines during insertion of the longitudinal members into the module, positioning of the module core is retained, the shimming structure 50 comprises at least one of the following means:
  guide means 58 for cables 60, and/or
  means 56 for housing an electrical connection capable of cooperating with complementary connection means connected to the storage elements, and/or
  means 68 for housing a connection to an electronic card 62, and/or
  attachment means 66 of the electronic card 62, and/or attachment means of at least one sensor.

The existence of the structure is used to further simplify the manufacturing method of the module by integrating functions on the latter. All connections are assembled especially on the structure prior to placing the elements on the latter, which prepares the structures outside the main mounting chain and further lowers costs of the manufacturing method of the module.

The storage elements are arranged side by side such that each assembly has a first end stopping against the supporting wall and a second end stopping against the wall of the envelope opposite the reference wall. <<Stopping against>> means that the elements are held in position by said walls. The elements can for example be in direct contact with one of the walls. A non-rigid piece (such as a mat or insulating foil) can also be inserted between the elements and one of the walls or the walls. It is not considered that the assembly is stopped against such a non-rigid piece, as the latter is unlikely to influence only the position of one or the other of the contact faces and/or the distance between the two contact faces.

Another aim of the invention is an assembly method of an energy storage module 10; 100 intended to contain a plurality of energy storage elements 14; 114 in an envelope 16, comprising the following steps:
  placement of a supporting wall 22; 122 in a piece 20; 120 having a closed outline and sized to receive the storage elements, the piece forming a portion of an envelope 16 of the module and comprising at least the lateral walls of the envelope, such that the supporting wall 22; 122 is parallel and adjacent to one of the lateral walls, called a parallel reference wall 20A; 120A, and the supporting wall is placed in an assembly position, at a first distance D1 from the reference wall,
  insertion by sliding the storage elements 14; 114 into the piece 20; 120 such that once inserted the elements are in contact with the supporting wall 22; 122,
  modification of the position of the supporting wall 22; 122 such that it moves from the assembly position to an operating position, in which it is at a second distance 92 from the reference wall, greater than the first distance D1, the operating position being selected so as to press at least one member in association with the storage elements against a wall 20B, 120B of the piece opposite the reference wall 20A; 120A.

The method according to the invention can also comprise one or more of the characteristics listed hereinbelow:

the elements 14; 114 can be positioned relative to the supporting wall 22; 122 prior to insertion in the piece, the latter and the supporting wall being inserted simultaneously into the piece, the modification step of the position of the supporting wall 22 comprises an insertion step of at least one shim, especially one or more longitudinal members 24A-24B; 80A-80B, in the piece, between the reference wall 20A and the supporting wall 22, the modification step of the position of the supporting wall 22; 122 can (also or alternatively) comprise a release step of pre-stressed elastic means 90; 124. These means can especially be inserted simultaneously to the shim or shims 80A-80B as they are in a single piece with this shim or these shims. The release step of these pre-stressed elastic means is especially a step of displacement or rupture of holding means 92; 126 of these elastic means in a stressed position, insertion of the or of at least one of the shims or longitudinal members 24A-24B; 80A-80B is executed in cooperation with the longitudinal member with a guide rail 26A-26B arranged in a single piece with the reference wall, the insertion step of the storage elements into the piece comprises an insertion step of the storage elements 14; 114 in a shimming structure 50; 150 comprising a plurality of housings 52 capable respectively of receiving at least one storage element and a positioning step of the shimming structure 50 containing the elements relative to the supporting wall 22; 122, the method comprises, prior to the positioning step of the shimming structure, especially insertion of the elements 14 in the shimming structure 50, an assembly step of electronic connector elements, especially at least one cable 60, at least one electronic card 62, at least one connector, at least one sensor, on the shimming structure 50.

More particularly the module 10 shown in the figures will now be described.

As is evident in FIG. 1, the module 10 comprises first of all a module core 12 comprising six energy storage elements 14 which will be described in more detail hereinbelow.

It also comprises an envelope 16 of essentially parallelepiped form and comprising six walls. This envelope is made in three parts: a first end wall 18A, a second end wall 18B and a piece 20 comprising all the lateral walls of the module. This piece is tubular in form. It has a closed outline and is of course sized to receive the module core 12 and especially the elements 14. The envelope is generally made of thermally conductive material, metallic material for example.

As is evident in FIGS. 1 and 2 the module also comprises a supporting wall 22 intended to be placed between the lower wall 20A of the module (called reference wall 20A) and the lower wall of the module core. This wall 22 is substantially of the same dimensions as the reference wall 20A and is intended to be positioned substantially parallel to the latter. It is also made of thermally conductive material, but electrically insulating to prevent short-circuits between the different storage elements 14.

Between the lower wall 20A, called a reference wall, and the supporting wall 22, the module also comprises two inserted longitudinal members 24A and 24B. As is evident in FIGS. 2 and 3, the longitudinal members 24A, 24B are intended to cooperate with guide rails arranged on the reference wall 20A, each of the guide rails 26A, respectively 26B, receiving a longitudinal member 24A, respectively 24B. It is evident that the guide rails extend in this embodiment in a direction essentially parallel to a ridge of the parallelepiped but this is not a necessity. The rails extend over one part only of the longitudinal dimension of the reference wall 20A but they could extend over the whole of this dimension.

As is evident in FIG. 1, the longitudinal members 24A, 24B are intended to extend substantially over the entire length of the reference wall 20A. They are made of metal and are thermally conductive. The longitudinal members 24A, 24B each have a bevelled longitudinal end 25. Their thickness at this end is therefore less than their maximal thickness, making their insertion in the envelope 20 easier.

Each longitudinal member 24A, 24B has an inverted transversal T-section (or profile). It therefore comprises a flat lower face 30 intended to be in contact with the reference wall 20A. At its upper end it comprises a projection 32 intended to support the supporting wall 22 and two stop faces 34 parallel to the face 30 and extending on either side of the projection 32.

The guide rail 26A, 26B comprises per se two longitudinal projections 36 whereof the spread is selected to correspond to the transversal dimension of the longitudinal member. Each projection 36 comprises a guide part 38 extending according to a plane essentially normal to the reference wall 20A. This guide part guides and holds the longitudinal member in position in the plane of the reference wall. At the free end of this guide part 38, at a distance from the reference wall 20A, each projection 36 comprises a return 39 essentially parallel to the reference wall 20A and oriented to the other projection 36 of the guide rail, arranged to cooperate with the stop faces 34 of the longitudinal member.

It is clear that each rail complies so that the spread between the two projections 36 at the level of the returns 39 allows passage of the projection 32 of the longitudinal member and the supporting wall 22 is supported only on the projection 32 of the longitudinal member, specifically that there is a distance between the upper end of the guide rail 26 and the supporting wall 22, once the module is assembled, as is evident in FIG. 2.

The module also comprises a thermal mat 28 intended to be interposed between the upper end of the module core 12 and the upper wall 20B of the piece 20. This thermal mat is made of electrically insulating and thermally conductive material, such as EPDM (ethylene-polypropylene-diene monomer). This material is also elastically deformable, especially compressible.

More specifically the module core 12 will now be described, by means of FIGS. 4 and 5. This module core comprises six energy storage elements 14, each element conventionally having an essentially cylindrical form and comprising a tubular casing 14A with a base, this base forming a first electric terminal (for example a positive terminal) of the element, and a lid 14B, electrically insulated from the casing 14A, for example by an electrically insulating joint inserted between these two pieces. The lid forms a second electric terminal of the element, for example a negative terminal. It comprises an end wall and a cylindrical rim 15 partially covering the lateral wall of the casing, the diameter of this rim being greater than the diameter of the lateral wall.

The elements 14 are connected electrically in series by means of connection links 40 made of electrically and thermally conductive material, especially metallic. These links 40 each connect a first terminal of a given element 14 to a second terminal of an adjacent element 14. Each element 14 is connected to a different element at each of its terminals. The module core 12 also comprises links 42 not connecting the element on which they are attached to any other element. These links are connected by connectors 44 to the terminals 46 of the module, arranged here on the wall 18A of the envelope, by which the module is connected to the external elements.

The module core 12 also comprises a shimming structure 50, clearer in FIG. 5. This shimming structure 50 is made of electrically insulating material, especially plastic material, by moulding, giving it a complex form and integrating many functions on this structure.

The structure 50 comprises a plurality of housings 52, each housing being sized to receive an energy storage element 14. Each housing is also enclosed by a rim 54 intended to cooperate with a lateral wall of the casing 14A and a free end of the rim 15 of the lid 14B to execute centring and holding in position according to the axial direction of the element.

This shimming structure 50 also comprises recessed projections 56 located between the housings 52. These projections 56 are configured for holding in position an electric connector of female type (not visible), for example a lug of Faston® type. Such a connector cooperates with a complementary connector, of male type, connected to an electric terminal of an energy storage element. In the embodiment described here, this complementary connector is a tab 57 arranged on the connection link 40, in a plane essentially perpendicular to the plane of the link and at the end face of the energy storage elements 14. Such a connector 58 plugged into the projection 56 is evident in FIG. 4.

The shimming structure 50 also comprises guide means for cables, comprising deformable pairs of tabs between which the cables 60 can be inserted by clipping. These cables 60 are generally used in energy storage modules to connect the elements 14 to an electronic card 62 (evident in FIG. 1), capable of balancing the load of the different elements 14 of the module. They are especially connected to the connector placed in the projection 56.

The electronic card 62 is intended to be positioned vertically, parallel to a support face 64 of the shimming structure, located at one end of the latter. The shimming structure 50 also comprises attachment means of the electronic card 62, comprising four shanks 66 by means of which the electronic card can be screwed onto the structure 50. This structure 50 also comprises a placement 68 for attaching an electric connector cooperating with the electronic card. This placement is a recess made in the support face 64 opposite the placement provided for the connection on the electronic card. The connector to be placed in the recess 68 is connected to the cables 60 and plugged into the electronic card 62.

The shimming structure 50 comprises, in addition to all the means described previously for easily integrating the connections of the module, positioning means of the structure 50 on the supporting wall. These means comprise vertical pins 70 extending downwards and intended to be inserted in complementary orifices of the supporting wall 22, as better seen in FIG. 3.

The assembly method of the module such as described hereinabove will now be described.

During a first step, all the connections (cables 60, connectors, electronic card 62, etc.) are mounted on the shimming structure 50. Due to the presence of the shimming structure, this operation can in fact be performed before the elements are mounted on the structure and outside the main assembly chain, which gives consequent time gain.

The elements 14 are then inserted into the housings 62 of the shimming structure, provided for this effect. As the elements 14 are intended to be connected in series by means of links, the elements are placed such that the second terminal (lid 14B) of a given element is located in the same plane as the first terminal (base of the casing 14A) of an adjacent element. As is evident in the figures, the elements are therefore placed head to tail in the structure 50.

Next, once the elements 14 are positioned correctly, by means of rims 54, the links 40, 42 are placed on the elements, on an end face of the elements 14. The links 40 are positioned such that their tab 58 is inserted into the lug located in the recess of the projection 56 and then the links are welded onto the elements. The core of the module 12 is then turned over and the same operation is repeated on the other side.

The end face 18A on the module core is then mounted such that the connectors 46 of the links 42 are correctly placed relative to the terminals 72 of the module borne by this wall 18A.

The core of the module 12 fitted with the end face is then placed on the supporting wall 22. The module core 12 is positioned correctly on this wall, by means of means 70 described earlier.

The thermal mat 28 is then placed on the upper end face of the module core 12.

Once this sub-assembly is formed, as is evident in FIG. 6A, the sub-assembly is slid into the piece 20 of the envelope such that the supporting wall 22 is parallel to the reference wall 20A, corresponding to the lower wall of the module, and until the end wall 18A is stopped against the corresponding end of the piece 20. Next, as is evident in FIG. 6B, the longitudinal members 24A, 24B are slid into the guide rails 26A, 26B of the envelope provided for this effect. The longitudinal members are inserted into the rails by their bevelled end 25.

Prior to insertion of the longitudinal members, the supporting wall 22 was resting on the guide rails of the piece 20, at a first distance D1 from the reference wall 20A. The piece is configured such that its height between the upper end of the rails 26A, 26B and the upper wall of the piece is greater than the height of the abovementioned sub-assembly, and irrespective of the manufacturing tolerances of the elements, the sub-assembly is easily slid into the module. As there is no contact between the sub-assembly and the upper wall, this operation is in fact simple.

Next, when the longitudinal members are inserted into the piece, they raise the sub-assembly enabling the thermal mat 28 to come into close contact with the upper wall 20B of the piece 20 of the envelope, also called thermal dissipation wall as it is first and foremost via this wall that heat generated in the module is discharged. The supporting wall 22 is at a second distance D2, greater than the first distance D1, from the reference wall 20A. The thermal mat is even stressed in compression to ensure good contact with the upper wall. This deformable character of the thermal mat also offers close contact with the upper wall, irrespective of the manufacturing clearances of the longitudinal members, the piece 20 and the elements, preventing the stack of different elements from holding on inside the piece 20.

Once the longitudinal members are inserted into the module, it remains to place the wall 18B on the piece 20 and attach the respective end walls 18A, 18B to the piece to obtain the finished module. Tightness between these different elements is ensured by means of an elastic joint placed at the interface of the piece 20 and the end walls 18A, 18B or overmoulded onto one or the other of these elements.

As is evident in FIG. 3, the finished module enables better diffusion of heat since the heat is diffused via two separate avenues: by means of the thermal mat and the upper wall 20B on one hand and by means of the supporting wall 22 and the longitudinal members 24A-24B on the other. Heat is therefore discharged more rapidly towards the envelope of the module. Also, since the envelope has a closed outline made in a single piece, heat is diffused easily (no interface) to the vertical walls from the upper wall and/or the lower wall of the module. Heat is better distributed in the module and the exchange surface with the air or other elements of the environment of the module (here, for example a chassis of the vehicle, placed in contact with the lower wall of the module) is therefore greater. This also improves evacuation of heat.

A variant of the embodiment described earlier will now be described in reference to FIG. 7. In this embodiment, longitudinal members 80A, 80B are also inserted into the piece in place of longitudinal members 24A, 24B. These longitudinal members also extend essentially according to the entire longitudinal dimension of the reference wall and are made of metal. Their profile varies however from that of longitudinal members 24A, 24B shown previously and are shown in FIG. 7.

As is evident, the longitudinal members 80 comprise a Z-shaped profile 82, having a support wall (lower in the present case) on the reference wall 20A and a support wall 86 (upper in the present case) on the supporting wall. These two walls 84, 86 are connected by a diagonal wall 88 which lets the profile acquire some elasticity in the direction normal to the walls 84, 86 (also normal to the walls 20A, 22 when the longitudinal member 80 is placed in the piece) since the height of the profile can be modifies according to the inclination of the diagonal wall, as seen between the positions shown in dashes and in dots in FIG. 7.

The profile 82 also comprises in its diagonal wall a plurality of openings distributed over the entire length of the profile (not seen in figure). It can especially comprise an opening in the vicinity of each of its ends and one in the vicinity of the middle of the profile according to this direction.

Placed in each of the openings is a spring 90 whereof a first end is connected to the upper wall 84 of the profile and a second end is connected to the lower wall 86 of the latter.

The spring 90 is held in the stressed position in compression, that is, its length is less than its resting length by pliers 92 comprising two branches 94, 96 attached respectively to the ends of the spring and having a predetermined length (corresponding to the length of the spring 90 and therefore less than the resting length of the spring). Alternatively, the holding means could comprise one or more vertical tabs connecting, the walls 84, 86 of the longitudinal member 80, such a tab being breakable.

When the longitudinal member 80 is inserted into the piece, the springs 90 are in a stressed position by means of pliers 92, constituting the assembly position of the module, shown in dashes in FIG. 7. The longitudinal members are inserted easily into the piece. Next, the pliers are removed such that the springs tend to return to their resting length, increasing the height of the longitudinal member. The unstressed position corresponds to the configuration of the longitudinal member 80 when the supporting wall is in the operating position, shown in dots in FIG. 7.

Such a longitudinal member presses the elements against the thermal dissipation wall 20B of the module and these irrespective of the manufacturing tolerances of the different elements (piece 20, elements 14). In fact, as opposed to where the longitudinal member is rigid, the operating position of the supporting wall 22 and the distance D2 can vary as a function of the modules.

It is noted that the resting length of the spring is selected such that it can press the elements against the dissipation wall even if the elements have their minimal size and the piece its maximal size, given the manufacturing clearances. The resting length of the spring is especially greater than its length when the longitudinal member is in an operation configuration.

Yet another variant of the embodiment of the module of FIG. 1 to FIGS. 8A and 8B is illustrated. These figures show a module 100 in section during mounting of the module core 112 into the piece 120 (distance D1 between the holding and reference walls) then the module following insertion of the module core into the piece 120 (distance D2 between the holding and reference walls). The points common to both this module and that of FIG. 1 will not be described in further detail.

As is evident in figures, the module according to this variant comprises an undulated thermal dissipation wall 120B, as opposed to the thermal dissipation wall 20B of the first embodiment. These undulations 121 extend over the entire longitudinal dimension of the piece and are sufficiently close that the thermal mat 128 to the right of each element 114 is capable of being in contact with the wall 120B at several places. These undulations also have a height which does not exceed 1 cm to avoid increasing the volume of the module. Their spread is especially less than 2 cm. Their presence on the upper wall has been imagined so as not to damage the thermal mat.

In fact, as a function of the manufacturing tolerances of the piece 120, and the elements 124 especially, the distance to be attained so that the elements 114 in thermal contact are in contact with the wall 120B will not always be the same and the thermal mat therefore will not always be compressed in the same way. Here, the mat is allowed to be in close contact with the upper wall at the level of the sites 160 of the wall 120B closest to the wall 120A irrespective of the manufacturing tolerances of the different elements. However, when the mat must be highly compressed, it is likely to be damaged if its compressibility limit is exceeded. This phenomenon is avoided with areas 162 being placed between the contact sites 160, in which the thermal mat 128 is not compressed and can even <<dampen>> the compression undergone at the level of the contact sites.

It is clear that these embodiments do not describe the invention in a limiting manner. The latter can have many variants relative to what has been described, and still be within the scope of the claims. For example:
 the reference wall can be any wall of the piece 20. The piece can also comprise several reference walls;
 the module cannot be parallelepiped,
 the form of the thermal dissipation wall is not limited to what has been described. Also, to fulfil the same function as that fulfilled by undulations, the thermal mat can be hollowed out by areas,
 the piece of the envelope can comprise one of the end walls,
 the number of longitudinal members can be different to what has been described,
 the longitudinal members and/or the supporting wall can be made of thermally insulating material, the form of the longitudinal members (cross-section, etc.) is not limited to what has been described. The longitudinal members may for example not comprise a bevelled end, a thermal mat can be introduced as replacement or addition to the thermal mat 38 between the supporting wall 22 and the elements 14. The module may also comprise no thermal mat, the guide rails are optional. When they are provided, their form is not limited to what has been described above, the holding means of the elastic means can be also breakable and connect two walls of the module especially of the shim, the shimming structure is optional. Its form and the functions it integrates are not limited to what has been described above.

Similarly, as for the assembly method, the steps can vary as a function of the elements present or not in the module. Neither is the order of the steps limited to the above. For example, in terms of a module such as that of FIG. 1, the end wall 18A could be attached to the module core on completion of assembly, just before it is affixed to the piece 20, or before the electronic card is affixed to the structure. The thrust of the structure 150 can also be made according to the longitudinal direction.

The invention claimed is:

1. An energy storage module suitable for containing a plurality of energy storage elements, the module comprising:
   an envelope comprising at least a plurality of lateral walls and two end walls, the lateral walls being made in a single piece having a closed outline and sized to enclose the energy storage elements,
   a supporting wall of energy storage elements separate from the walls of the envelope, and intended to extend essentially parallel to one of the lateral walls, called a reference wall,
   wherein the module further comprises:
   means suitable for modifying the position of the supporting wall between at least one assembly position, wherein the supporting wall is at a first distance from the reference wall and an operating position, wherein the supporting wall is at a second distance from the reference wall, greater than the first distance,
   the means for modifying the position of the supporting wall comprising at least one shim intended to be inserted between the reference wall and the supporting wall, the shim especially having the form of a longitudinal member,
   the reference wall comprising at least one guide rail capable of cooperating with the or at least one of the shims.

2. The module according claim 1, wherein the piece comprising the lateral walls is open at its two ends, the module further comprising two end walls, each end wall being independent respectively of the piece and capable of closing the latter at an open end.

3. The module according to claim 1, wherein the or at least one of the shims is configured to be able to deform elastically at least according to the direction normal to the reference wall to which the or at least one of the shims is connected.

4. The module according to claim 1, wherein the means for modifying the position of the supporting wall can also comprise elastic means and means for holding the elastic means in a stressed position.

5. The module according to claim 3, wherein the elastic means are in a single piece with the or at least one of the shims.

6. The module according to claim 1, comprising at least one member made of compressible material intended to be placed between the supporting wall and the storage elements and/or between the storage elements and a lateral wall of the envelope opposite the reference wall.

7. The module according to claim 1, wherein the or at least one of the shims, the elastic means and/or the supporting wall are made of thermally conductive material.

8. The module according to claim 1, comprising a single reference wall formed by the lower wall or the upper wall of the envelope.

9. The module according to claim 1, wherein the wall of the envelope opposite the reference wall is configured such that its distance relative to the reference wall varies locally, and comprises undulations.

10. The module according to claim 1, comprising a shimming structure of storage elements, made of electrically insulating material and comprising a plurality of housings to receive the energy storage elements.

11. The module according to claim 1, wherein the shimming structure comprises positioning means, especially attachment, relative to the supporting wall.

12. The module according to claim 10, wherein the shimming structure comprises at least one of the following means:
   guide means for cables, and/or
   means for housing an electric connector capable of cooperating with complementary means connected to the elements, and/or
   means for housing a connector to an electronic card, and/or
   attachment means of the electronic card, and/or
   attachment means of at least one sensor.

13. The module according to claim 1, wherein the storage elements are arranged side by side such that each assembly has a first end stopping against the supporting wall and a second end stopping against the wall of the envelope opposite the reference wall.

14. An assembly method of an energy storage module intended to contain a plurality of energy storage elements in an envelope, comprising the following steps:
   placement of a supporting wall in a piece having a closed outline and sized to receive the storage elements, the piece forming a portion of an envelope of the module and comprising at least the lateral walls of the envelope, such that the supporting wall is parallel and adjacent to one of the lateral walls, called a parallel reference wall, and the supporting wall is placed in an assembly position, at a first distance from the reference wall,
   insertion by sliding the storage elements into the piece, such that once inserted the elements are in contact with the supporting wall,
   modification of the position of the supporting wall such that the supporting wall moves from the assembly position to an operating position, wherein the supporting wall is at a second distance from the reference wall, greater than the first distance, the operating position being selected so as to press at least one member in association with the storage elements against a wall of the piece opposite the reference wall, the modification step of the position of the supporting wall comprising an insertion step of at least one shim, especially one or more longitudinal members, into the piece, between the reference wall and the supporting wall, insertion being carried out in cooperation with the at least one shim with at least one guide rail of the reference wall.

15. The method according to claim 14, wherein the modification step of the position of the supporting wall comprises a release step of pre-stressed elastic means.

16. The method according to claim 14, wherein the insertion step of the storage elements into the piece comprises an insertion step of the storage elements in a shimming structure comprising a plurality of housings capable respectively of receiving at least one storage element and a positioning step of the shimming structure containing the elements relative to the supporting wall.

17. The method according to claim 16, comprising, prior to the positioning step of the structure on the supporting wall, especially insertion of the elements in the shimming structure, an assembly step of at least one electronic connector element, especially at least one cable, at least one electronic card, at least one connector, at least one sensor, on the shimming structure.

18. The module according to claim 4, wherein the elastic means are in a single piece with the or at least one of the shims.

* * * * *